United States Patent
Zawadski

[15] 3,699,849
[45] Oct. 24, 1972

[54] HYDRAULIC CELL FOR CALIBRATING A PRESSURE TRANSDUCER

[72] Inventor: Raymond J. Zawadski, Spokane, Wash.

[73] Assignee: The United States of America as represented by the Secretary of the Interior

[22] Filed: Nov. 12, 1970

[21] Appl. No.: 88,958

[52] U.S. Cl. .................. 92/61, 92/245, 73/407
[51] Int. Cl. ....................................... F01b 1/02
[58] Field of Search ..... 73/88.5, 407, 410; 92/50, 61, 92/97, 48, 49, 99, 245, 101, 128

[56] References Cited

UNITED STATES PATENTS

| | | | |
|---|---|---|---|
| 1,868,935 | 7/1932 | Breneman | 92/245 |
| 2,902,048 | 9/1959 | Ryan | 92/103 X |
| 2,992,705 | 7/1961 | Chisnell et al. | 92/245 X |
| 3,025,871 | 3/1962 | Roth et al. | 92/245 X |
| 3,572,217 | 3/1971 | Corry | 92/48 |
| 2,784,593 | 3/1957 | Peucker | 73/407 X |
| 3,162,795 | 12/1964 | Cherniak | 73/407 X |
| 3,041,115 | 6/1962 | Boyer | 92/75 X |
| 3,052,126 | 9/1962 | Laas | 73/407 |
| 3,208,358 | 9/1965 | Harms et al. | 92/50 X |
| 3,342,201 | 9/1967 | Grogono | 73/407 X |

Primary Examiner—Milton Kaufman
Assistant Examiner—Ronald H. Lazarus
Attorney—Ernest S. Cohen and Albert A. Kashinski

[57] ABSTRACT

A hydraulic cell is used for calibrating an electromechanical pressure transducer. The transducer is positioned in the cell between an opposed pair of free-floating pistons. Calibration pressures are uniformly exerted upon the transducer by forcing the pistons toward one another with pressurized fluid injected into pressure chambers behind the pistons.

2 Claims, 2 Drawing Figures

PATENTED OCT 24 1972

3,699,849

INVENTOR
RAYMOND J. ZAWADZKI

BY Ernest S. Cohen
Albert A. Tashinski
ATTORNEYS

HYDRAULIC CELL FOR CALIBRATING A PRESSURE TRANSDUCER

BACKGROUND OF THE INVENTION

Pressure measuring transducers are in common use. A typical electro-mechanical pressure transducer is shown in U.S. Pat. No. 3,372,577. Before use, such transducers require calibration to determine the electrical output corresponding to a given pressure input. For calibration, a pressure cell is commonly used. Prior art cells for calibrating pressure transducers are undesirable for several reasons. They are subject to failure after repeated use. Because they are subject to failure, they are limited to low operating pressures. To overcome these defects of the prior art, this invention was made.

SUMMARY OF THE INVENTION

This invention is an hydraulic cell for calibrating a pressure transducer. The cell has an opposed, mated pair of pressure resistant half-shells in which are nested a similarly opposed pair of free-floating resilient pistons. With the transducer sandwiched between the pistons, the half-shells are clamped together. Hydraulic pressure is exerted upon the pistons, forcing them toward one another and compressing the transducer between them. As axial pressure forces the pistons together, lateral pressure seals the pistons to the inner walls of the cell, preventing fluid leaks and permitting very high pressure operation. Because the cell is ruggedly designed and simply constructed, structural failure is avoided.

Therefore, one subject of this invention is a rugged hydraulic cell for uniform compression of an object.

Another object of this invention is a rugged hydraulic cell for calibrating a pressure transducer.

These and other objects of the invention are apparent in the following specification and drawing.

DESCRIPTION OF THE PREFERRED EMBODIMENT

Figure 1:
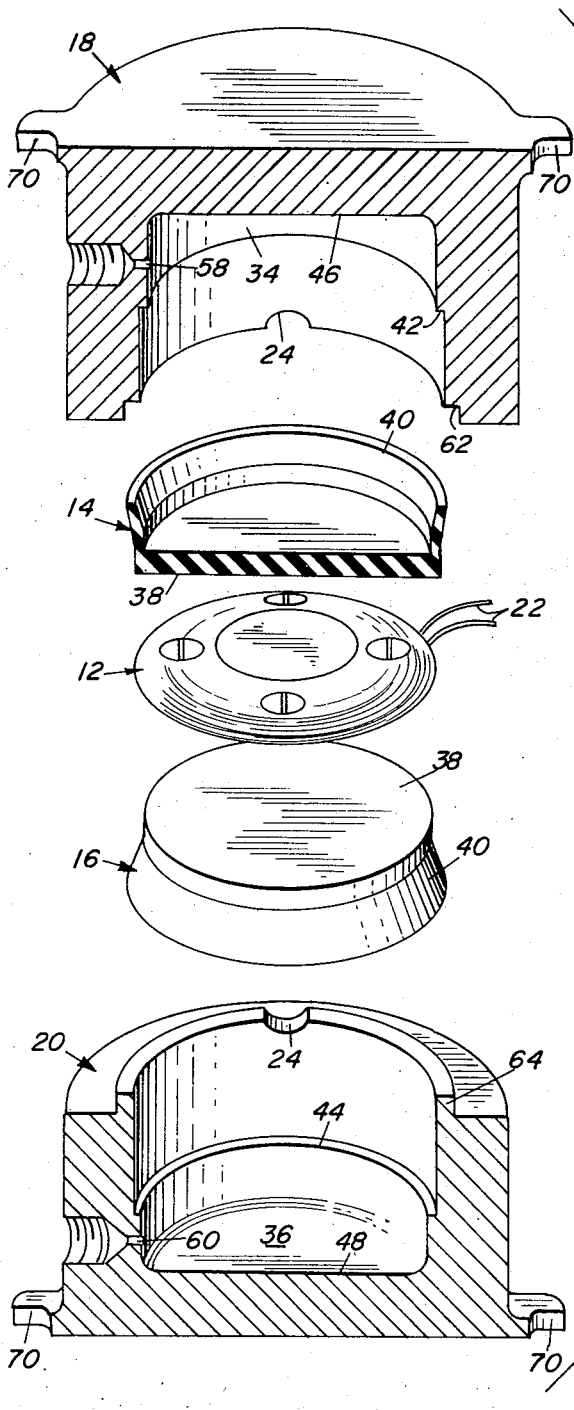
FIG. 1 is an exploded perspective view, in partial section, of a hydraulic cell.

An hydraulic cell 10 for calibrating an electro-mechanical pressure transducer 12 is shown in FIG. 1. The cell 10 includes an opposed pair of resilient hydraulic pistons 14 and 16, nested within a similarly opposed pair of mated upper and lower half-shells 18 and 20, as shown in assembled form in FIG. 2. For calibration, the transducer 12 is enclosed within the cell 10 between pistons 14 and 16. Electrical connections 22 between the transducer and monitoring equipment (not shown) pass through an opening 24 in the cell wall at the junction of the half-shells. With the transducer 12 positioned in a central chamber 26, hydraulic fluid from a high pressure source (not shown) is injected into two pressure chambers 34 and 36 behind the pistons, driving the pistons toward one another with the transducer 12 between them. By monitoring the electrical output for a range of known pressure inputs, the transducer response curve is determined.

Resilient hydraulic pistons 14 and 16 are similarly shaped, hollow cups with a flat, circular disc 38 abutting a hollow, truncated, conical flange 40. On their hollowed-out sides, hydraulic fluid contacts the pistons. On their other sides the pistons contact pressure transducer 12. Through displacement of the pistons, hydraulic pressure, acting upon the flat disc shaped area, is transferred directly to the transducer. Hydraulic pressure acting upon the inner conical walls 42 of the pistons presses the conical flanges laterally against the half-shell walls, sealing the pistons with increasing force as the hydraulic pressure increases.

In the upper and lower half-shells 18 and 20, the displacement of resilient pistons 14 and 16 is limited by narrow annular lips 42 and 44, spaced from the end walls 46 and 48 of pressure chambers 34 and 36. Adjacent to the pressure chambers, the pistons nest against smooth cylindrical walls 50 and 52 of central chamber 26 with a conforming pressure fit. Hydraulic fluid injected through hollow input connections 54 and 56, passes into pressure chambers 34 and 36 through injection ports 58 and 60, driving the resilient pistons away from the pressure chambers and toward the center of the cylindrical chamber.

Figure 2:
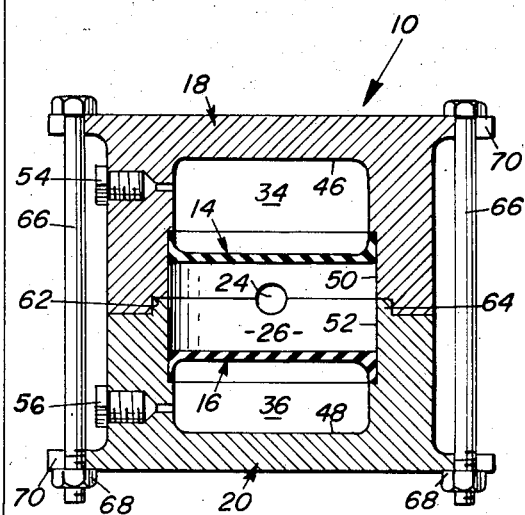
FIG. 2 is a side view, in partial section, of the cell shown in FIG. 1.

During assembly of the pressure cell 10, alignment is aided by an annular recess 62 in the upper half-shell 18 and by a protruding annular lip 64 in the lower half-shell. With resilient piston 16 in place above pressure chamber 36, the pressure transducer 12 is placed into the lower half-shell and electrical connections 22 strung across the depression of opening 24. With resilient piston 14 in place below pressure chamber 34, the upper half-shell is lowered onto the lower half-shell, with annular lip 64 seated within annular recess 62, as shown in FIG. 2. After bolts 66 and nut 68 are tightened within slotted flanges 70 on opposite sides of the half-shells, the sealed pressure cell 10 is ready for operation. Hydraulic pressure hoses (not shown) are connected to input connection 54 and 56 and transducer calibration is performed according to established prior art procedures.

While this invention is shown and described by reference to a specific preferred embodiment, modifications within the scope of this disclosure are expected. For this reason the scope of the invention is limited only by the following claims:

I claim:

1. An hydraulic cell for calibrating a pressure transducer comprising:
   an opposed pair of mated, pressure resistant half-shells having axially aligned, cylindrical inner walls and opposed end walls forming a hollow chamber,
   an opposed pair of spaced pistons, each seated with a conforming pressure fit for axial displacement along the cylindrical inner wall of one half-shell,
   a pressure chamber between each piston and the adjacent end wall,
   the cylindrical diameter of at least a part of each pressure chamber being less than the diameter of the adjacent piston, so that piston travel into the pressure chamber is limited,
   means for releasably binding the half-shells together, and
   an opening into each pressure chamber for injecting fluid under pressure to force the pistons toward one another.

2. An hydraulic cell for calibrating a pressure transducer as claimed in claim 1 including:
   an opening through the cell at a point between the pistons for passing electrical connections into the cell.

* * * * *